(12) United States Patent
Tanaka

(10) Patent No.: US 7,609,227 B2
(45) Date of Patent: Oct. 27, 2009

(54) LIQUID CRYSTAL DISPLAY APPARATUS

(75) Inventor: Shogo Tanaka, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 421 days.

(21) Appl. No.: 11/488,064

(22) Filed: Jul. 18, 2006

(65) Prior Publication Data

US 2007/0063941 A1    Mar. 22, 2007

(30) Foreign Application Priority Data

Sep. 21, 2005    (JP) .............................. 2005-274792

(51) Int. Cl.
*G09G 5/00* (2006.01)
*G06F 3/042* (2006.01)
(52) U.S. Cl. .............................. 345/1.1; 345/7; 345/176
(58) Field of Classification Search ................ 345/7–9, 345/156, 173, 102, 1.1, 176
See application file for complete search history.

(56) References Cited

U.S. PATENT DOCUMENTS

| | | | |
|---|---|---|---|
| 5,381,684 A | 1/1995 | Kawamura | |
| 5,450,292 A | 9/1995 | Yokoyama et al. | |
| 5,453,855 A | 9/1995 | Nakamura et al. | |
| 5,581,683 A | 12/1996 | Bertignoll et al. | |
| 5,828,415 A | 10/1998 | Keating et al. | |
| 5,936,596 A | 8/1999 | Yoshida et al. | |
| 6,046,849 A | 4/2000 | Moseley et al. | |
| 6,055,013 A | 4/2000 | Woodgate et al. | |
| 6,055,103 A | 4/2000 | Woodgate et al. | |
| 6,104,451 A | 8/2000 | Matsuoka et al. | |
| 6,108,060 A | 8/2000 | Funamoto et al. | |
| 6,377,295 B1 | 4/2002 | Woodgate et al. | |
| 6,437,915 B2 | 8/2002 | Moseley et al. | |
| 6,512,607 B1 | 1/2003 | Windsor et al. | |
| 6,545,655 B1 | 4/2003 | Fujikawa | |
| 6,624,863 B1 | 9/2003 | Jacobs et al. | |
| 6,628,352 B1 | 9/2003 | Sumida et al. | |
| 6,731,416 B2 | 5/2004 | Hazzard | |
| 6,954,185 B2 * | 10/2005 | Ogino | .......................... 345/7 |
| 6,960,001 B2 | 11/2005 | Nitto et al. | |
| 7,030,944 B2 | 4/2006 | Fujimoto | |
| 7,077,526 B2 | 7/2006 | Overmann et al. | |

(Continued)

FOREIGN PATENT DOCUMENTS

EP    0 829 744 A2    3/1998

(Continued)

OTHER PUBLICATIONS

S. Tanaka et al., "Display Apparatus," U.S. Appl. No. 11/520,748, filed Sep. 14, 2006.

(Continued)

*Primary Examiner*—Kevin M Nguyen
(74) *Attorney, Agent, or Firm*—Oliff & Berridge, PLC

(57) ABSTRACT

There is provided a display apparatus including a liquid crystal display having a parallax barrier so that a first image and a second image are respectively visible from different angles on a commonly provided display screen, a backlight that sheds lights from a backside of a liquid crystal panel, a touch operating portion provided at a surface side of the liquid crystal display, and an antiglare layer provided at a surface side of the touch operating portion.

4 Claims, 12 Drawing Sheets

U.S. PATENT DOCUMENTS

| | | | |
|---|---|---|---|
| 7,151,532 B2* | 12/2006 | Schulz | 345/173 |
| 7,167,222 B2 | 1/2007 | Inoue et al. | |
| 7,250,710 B2 | 7/2007 | Gilmour et al. | |
| 7,292,296 B2 | 11/2007 | Kanbe et al. | |
| 7,337,450 B2 | 2/2008 | Sato et al. | |
| 7,354,163 B2* | 4/2008 | Suzuki et al. | 359/601 |
| 2001/0043302 A1 | 11/2001 | Inoue et al. | |
| 2002/0001128 A1 | 1/2002 | Moseley et al. | |
| 2002/0101117 A1 | 8/2002 | Shibuya | |
| 2003/0085659 A1 | 5/2003 | Overmann et al. | |
| 2003/0142249 A1 | 7/2003 | Fujimoto | |
| 2004/0119896 A1 | 6/2004 | Kean et al. | |
| 2004/0263060 A1 | 12/2004 | Gilmour et al. | |
| 2004/0263717 A1 | 12/2004 | Hsu et al. | |
| 2005/0052529 A1 | 3/2005 | Mashitani et al. | |
| 2005/0111100 A1* | 5/2005 | Mather et al. | 359/464 |
| 2005/0174658 A1 | 8/2005 | Long et al. | |
| 2006/0066507 A1* | 3/2006 | Yanagisawa | 345/7 |
| 2006/0191177 A1* | 8/2006 | Engel | 40/453 |
| 2006/0192746 A1 | 8/2006 | Ioki et al. | |

FOREIGN PATENT DOCUMENTS

| | | |
|---|---|---|
| GB | 2 405 545 A | 3/2005 |
| GB | 2 405 546 A | 3/2005 |
| JP | A-05-055623 | 5/1993 |
| JP | A-05-246285 | 9/1993 |
| JP | A 06-186526 | 7/1994 |
| JP | A-6-236152 | 8/1994 |
| JP | A-7-103778 | 4/1995 |
| JP | A 09-046622 | 2/1997 |
| JP | A 10-123461 | 5/1998 |
| JP | A 10-130537 | 5/1998 |
| JP | A 11-052105 | 2/1999 |
| JP | A-11-52372 | 2/1999 |
| JP | A 11-084131 | 3/1999 |
| JP | A-11-088245 | 3/1999 |
| JP | A 11-095167 | 4/1999 |
| JP | A-11-109339 | 4/1999 |
| JP | A-11-248466 | 9/1999 |
| JP | A 11-331876 | 11/1999 |
| JP | A-11-339527 | 12/1999 |
| JP | A-2000-36927 | 2/2000 |
| JP | A 2000-047195 | 2/2000 |
| JP | A-2000-076838 | 3/2000 |
| JP | A 2000-137443 | 5/2000 |
| JP | A-2000-162979 | 6/2000 |
| JP | A-2000-180834 | 6/2000 |
| JP | A-2000-261731 | 9/2000 |
| JP | A-2001-083903 | 3/2001 |
| JP | A-2001-283926 | 10/2001 |
| JP | A-2001-311944 | 11/2001 |
| JP | A-2002-234399 | 8/2002 |
| JP | A 2003-121847 | 4/2003 |
| JP | A-2003-137005 | 5/2003 |
| JP | A-2003-196682 | 7/2003 |
| JP | A-2003-197018 | 7/2003 |
| JP | A 2003-337326 | 11/2003 |
| JP | A-2004-79488 | 3/2004 |
| JP | B2-3503925 | 3/2004 |
| JP | A-2004-233816 | 8/2004 |
| JP | A-2004-348204 | 12/2004 |
| JP | A-2005-71286 | 3/2005 |
| JP | A-2005-73076 | 3/2005 |
| JP | A 2005-078080 | 3/2005 |
| JP | A-2005-86773 | 3/2005 |
| JP | A-2005-255090 | 9/2005 |
| JP | A-2005-284592 | 10/2005 |
| JP | A-2005-313782 | 11/2005 |
| JP | A-2006-64733 | 3/2006 |
| JP | A-2006-076369 | 3/2006 |
| JP | A-2006-131227 | 5/2006 |
| JP | A-2006-151363 | 6/2006 |
| JP | A-2006-151364 | 6/2006 |
| KR | 10-2000-0008458 | 2/2000 |
| KR | 10-2005-0008173 | 1/2005 |
| WO | WO 97/42540 | 11/1997 |
| WO | WO 2004/011987 A1 | 2/2004 |
| WO | WO 2004/016460 A1 | 2/2004 |

OTHER PUBLICATIONS

S. Tanaka et al., "Display Apparatus and In-Vehicle Display Apparatus," U.S. Appl. No. 11/712,517, filed Mar. 1, 2007.

S. Tanaka et al., "Display Apparatus," U.S. Appl. No. 11/520,743, filed Sep. 14, 2006.

S. Tanaka, "Display Apparatus," U.S. Appl. No. 11/520,670, filed Sep. 14, 2006.

S. Tanaka et al., "In-Vehicle Display Apparatus and Display Control Method Therefor," U.S. Appl. No. 11/583,076, filed Oct. 19, 2006.

M. Maehata et al., "Receiver," U.S. Appl. No. 11/475,216, filed Jun. 27, 2006.

S. Tanaka, "Display Device and Display Method," U.S. Appl. No. 11/299,657, filed Dec. 13, 2005.

"Fujitsu Ten Technical Report", vol. 23, No. 2, Dec. 2005, pp. 22-27.

"Fujitsu Ten Technical Journal," No. 26, Jan. 2006, pp. 17-22.

* cited by examiner

FIG.1
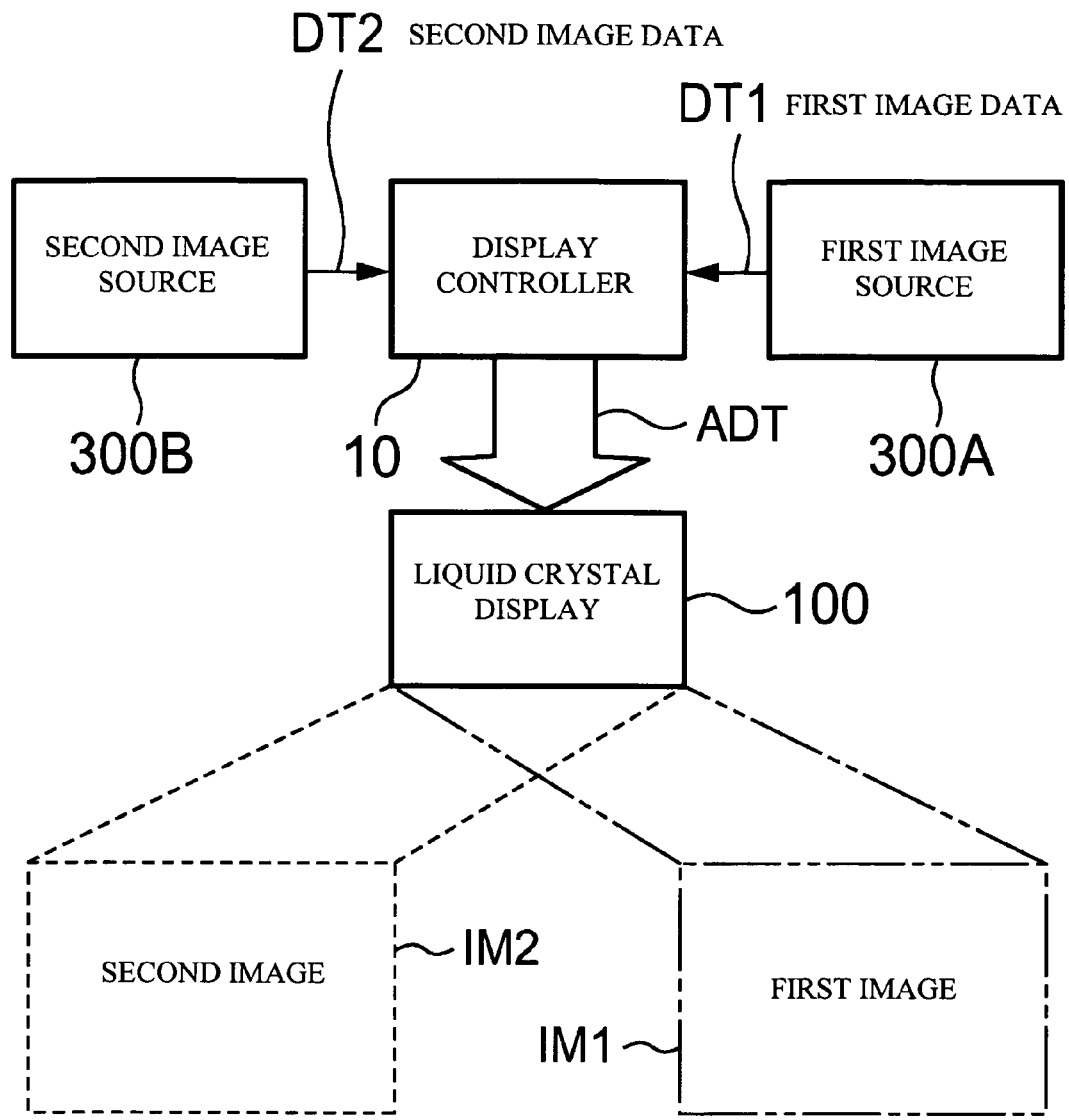
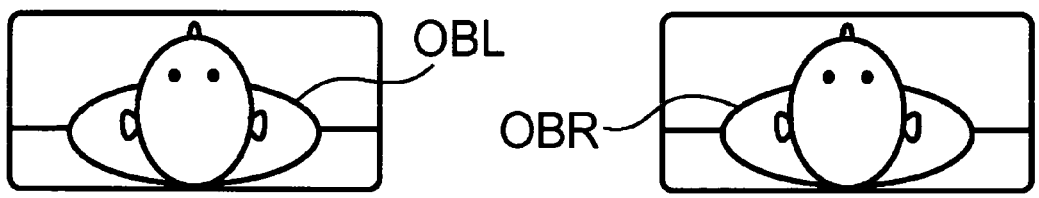

LIQUID CRYSTAL DISPLAY APPARATUS

BACKGROUND OF THE INVENTION

1. Field of the Invention

This invention generally relates to liquid crystal display apparatuses, and more particularly, to a liquid crystal display apparatus, on a common display screen of which, difference images are visible from difference angles, namely, a liquid crystal display apparatus having a so-called multi-view function.

2. Description of the Related Art

As a so-called multi-view display having a common display screen, on which different images are respectively visible from different angles, there has been known a multi-view display with a liquid crystal panel having a parallax barrier on the front side thereof. Different information (images) can be displayed on the right and left sides of the display screen by separating directions of lights through a backlight on a pixel basis (for example, as disclosed in Japanese Patent Application Publication No. 2005-78080). Such display is mounted on a vehicle, allowing the front-seat passenger to watch a TV program or another image, while the driver is checking a navigation map image.

With respect to the liquid crystal display apparatus, there is a need for preventing a real-world scene in front of the display screen from being superimposed over the screen or preventing the glare of a difference in brightness on the screen.

SUMMARY OF THE INVENTION

The present invention has been made in view of the above circumstances and provides a liquid crystal display apparatus where it is possible to prevent a real-world scene in front of a display screen from being superimposed over the screen or preventing the glare of a difference in brightness on the screen.

According to one aspect of the present invention, there is provided a display apparatus including: a liquid crystal display having a parallax barrier so that a first image and a second image are respectively visible from different angles on a commonly provided display screen; a backlight that sheds lights from a backside of a liquid crystal panel; a touch operating portion provided at a surface side of the liquid crystal display; and an antiglare layer provided at the surface side of the touch operating portion.

BRIEF DESCRIPTION OF THE DRAWINGS

Preferred embodiments of the present invention will be described in detail with reference to the following drawings, wherein:

FIG. 1 is a view illustrating a basic configuration of a multi-view display apparatus in accordance with a first embodiment of the present invention;

DESCRIPTION OF THE PREFERRED EMBODIMENTS

A description will now be given, with reference to the accompanying drawings, of embodiments of the present invention.

First Embodiment

FIG. 1 is a view illustrating a basic configuration of a multi-view display apparatus in accordance with a first embodiment of the present invention. Referring now to FIG. 1, the multi-view display apparatus includes a display controller 10 that serves as a display control portion and a liquid crystal display 100 that serves as a display portion. To the display controller 10, image data DT1 is supplied from a first image source 300A that serves as a supply source, and at the same time, image data DT2 is also supplied from a second image source 300B that serves as a supply source. The supply source may be a navigation portion or a TV program portion. Then, image data ADT, which is composed of the first image data DT1 and the second image data DT2, is output to the commonly provided display 100. The configuration of the display controller 10 will be described later in detail. The first image source 300A and the second image source 300B are respectively composed of a camera, TV receiver, DVD reproducing portion, HD reproducing portion, navigation portion, and the like, as will be described later.

The display 100 includes a liquid crystal panel, backlight, parallax barrier, and the like, as will also be described later. A first image IM1 based on the first image data DT1 and a second image IM2 based on the second image data DT2 are displayed on a common display screen so that an observer OBR can watch the first image IM1 from a right-hand direction and an observer OBL can watch the second image IM2 from a left-hand direction. The configuration of the display 100 will also be described later in detail.

Figure 2:
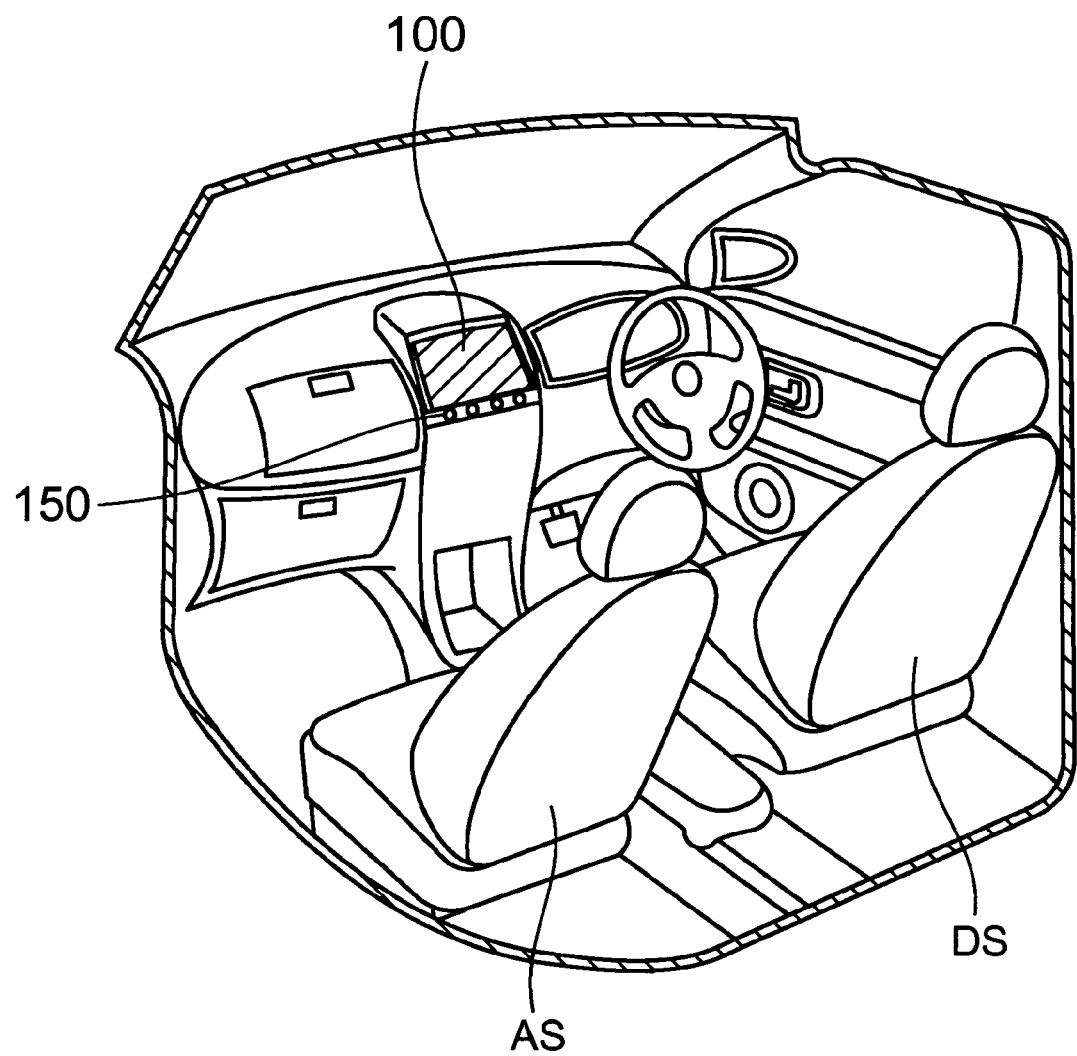
FIG. 2 is a perspective view showing an example in which the display apparatus is applied to a vehicle in accordance with the first embodiment of the present invention.

FIG. 2 is a perspective view showing an example in which the display apparatus is applied to a vehicle in accordance with the first embodiment of the present invention. Referring to FIG. 2, the display 100 is arranged between a driver's seat DS and a front passenger's seat AS in a dashboard area of the vehicle. In addition, the display 100 is provided with an operating portion 150 so as to manually operate the display apparatus. According to an exemplary embodiment shown in FIG. 2, a passenger who sits on the driver's seat DS corresponds to the above-described observer OBR, and another passenger who sits on the front passenger's seat AS corresponds to the above-described observer OBL. Those passengers are able to simultaneously watch the first image IM1 and the second image IM2, which are respectively different, being displayed on the display 100 from the driver's seat DS and from the front passenger's seat AS.

Figure 3:
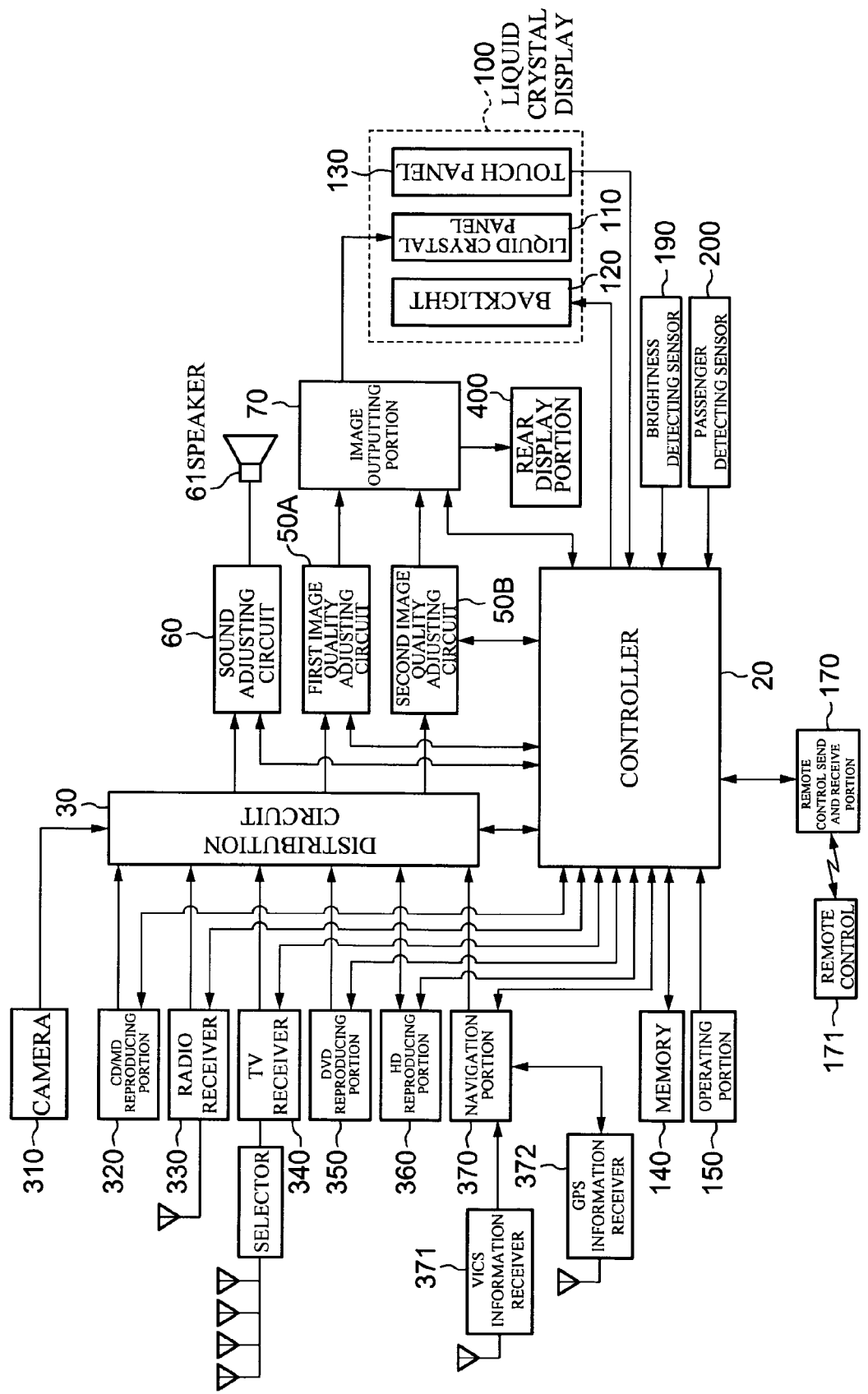
FIG. 3 is a functional block diagram of the display apparatus in accordance with the first embodiment of the present invention.
Figure 4:
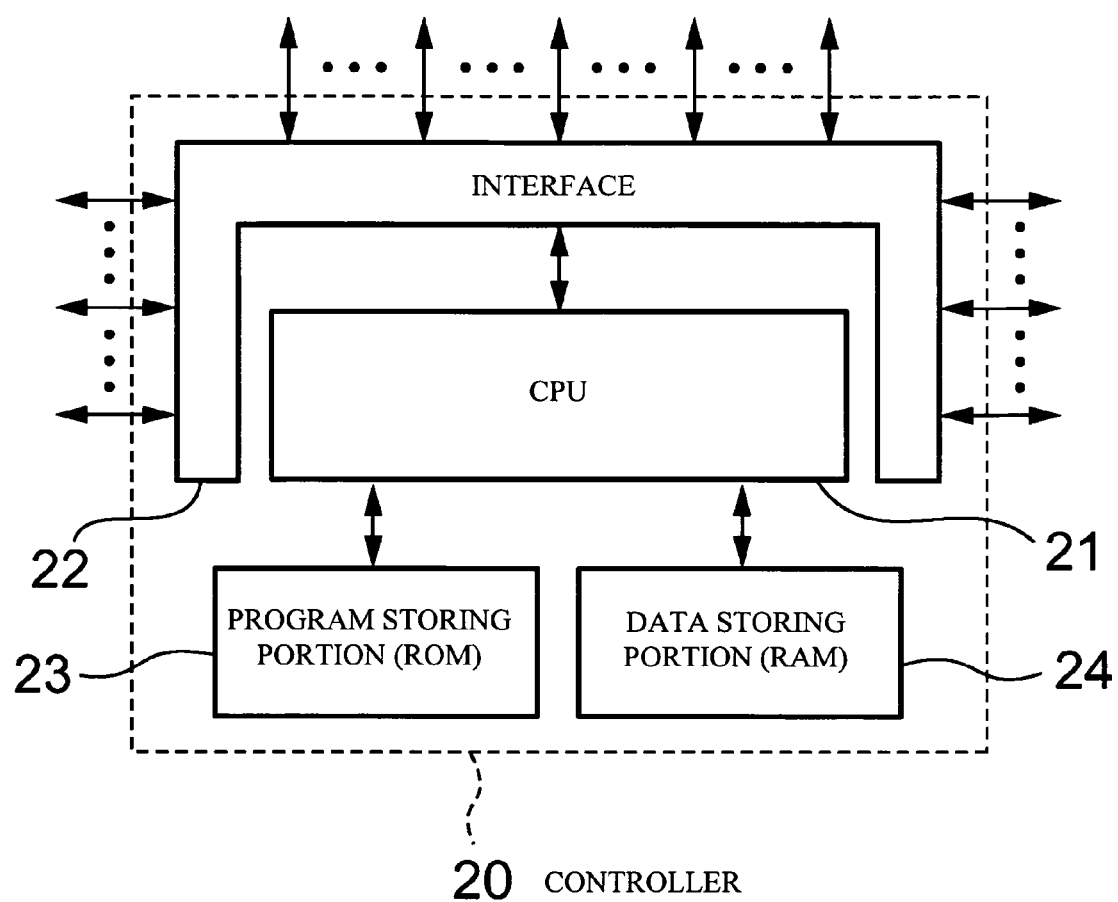
FIG. 4 is a functional block diagram showing a configuration of a controller in accordance with the first embodiment of the present invention.
Figure 5:
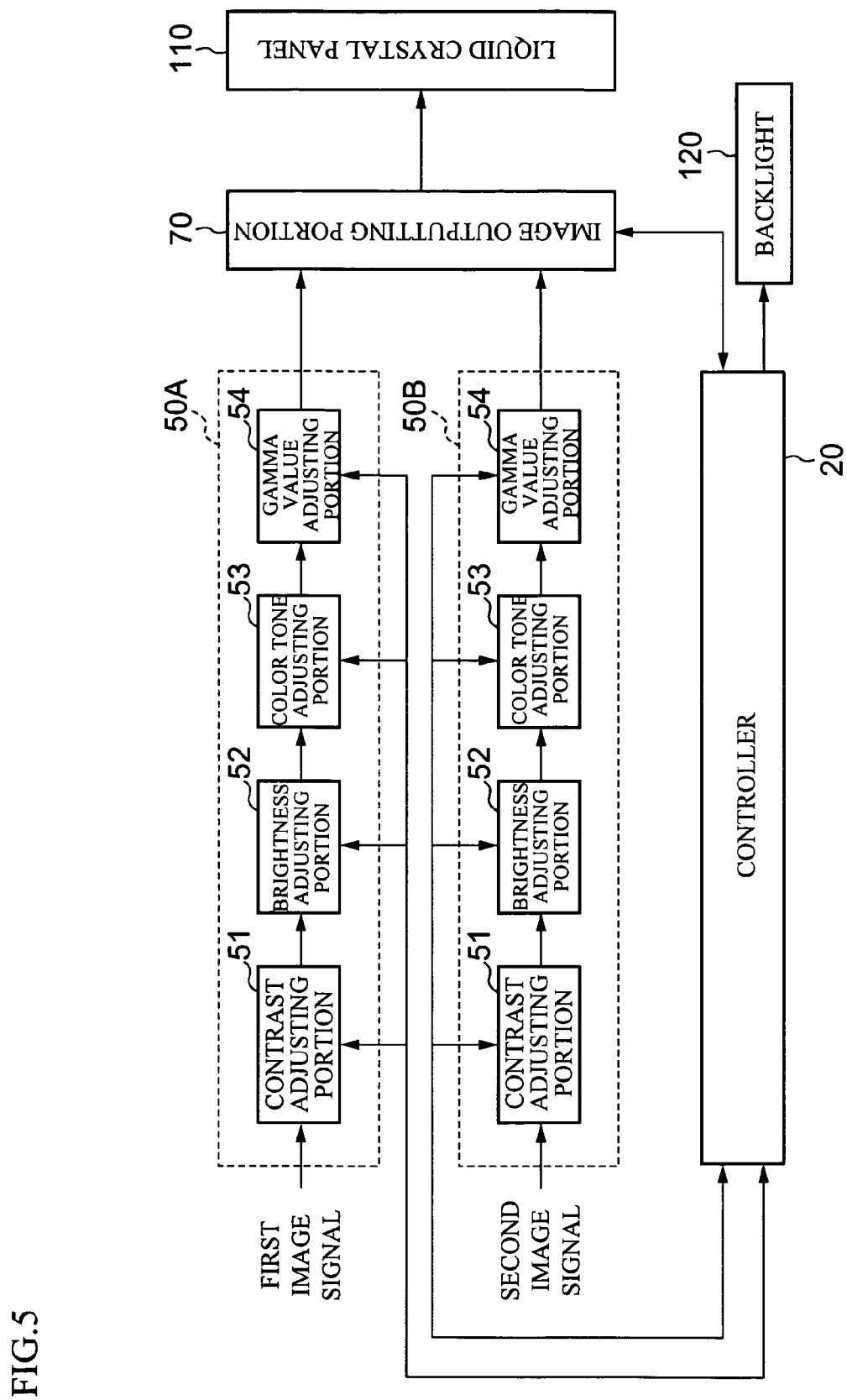
FIG. 5 is a functional block diagram of first and second image quality adjusting circuits in accordance with the first embodiment of the present invention.
Figure 6:
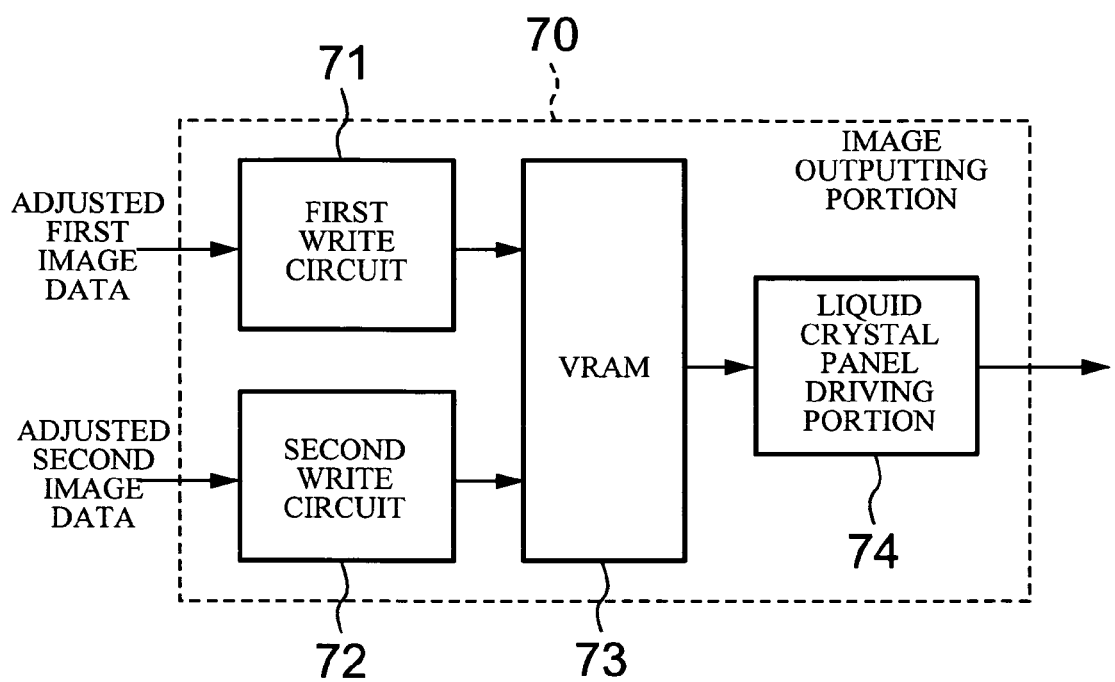
FIG. 6 is a functional block diagram of an image outputting portion in accordance with the first embodiment of the present invention.
Figure 7:
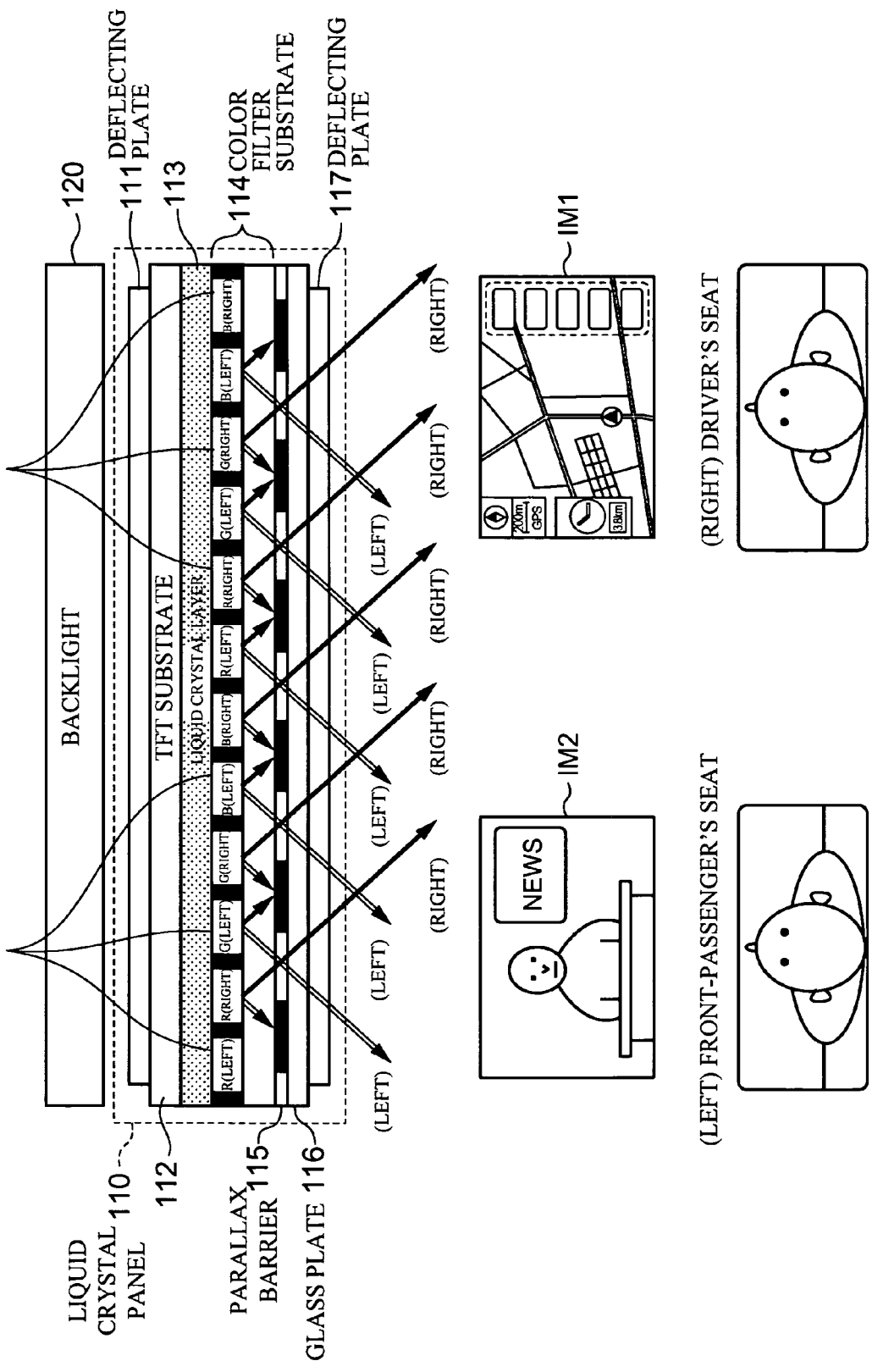
FIG. 7 is a view illustrating a cross-sectional configuration and effects of a liquid crystal panel in accordance with the first embodiment of the present invention.
Figure 8:
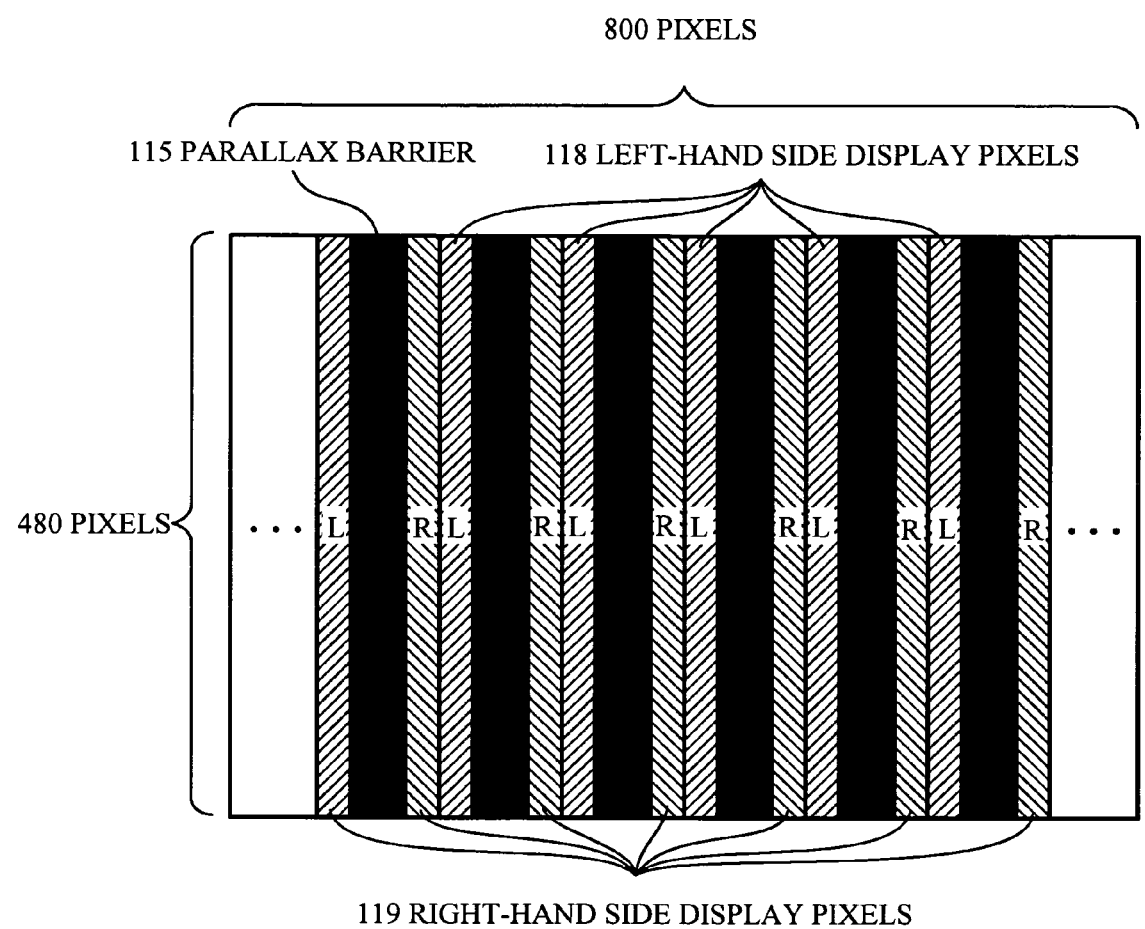
FIG. 8 is a front view of the liquid crystal panel in accordance with the first embodiment of the present invention.
Figure 9:
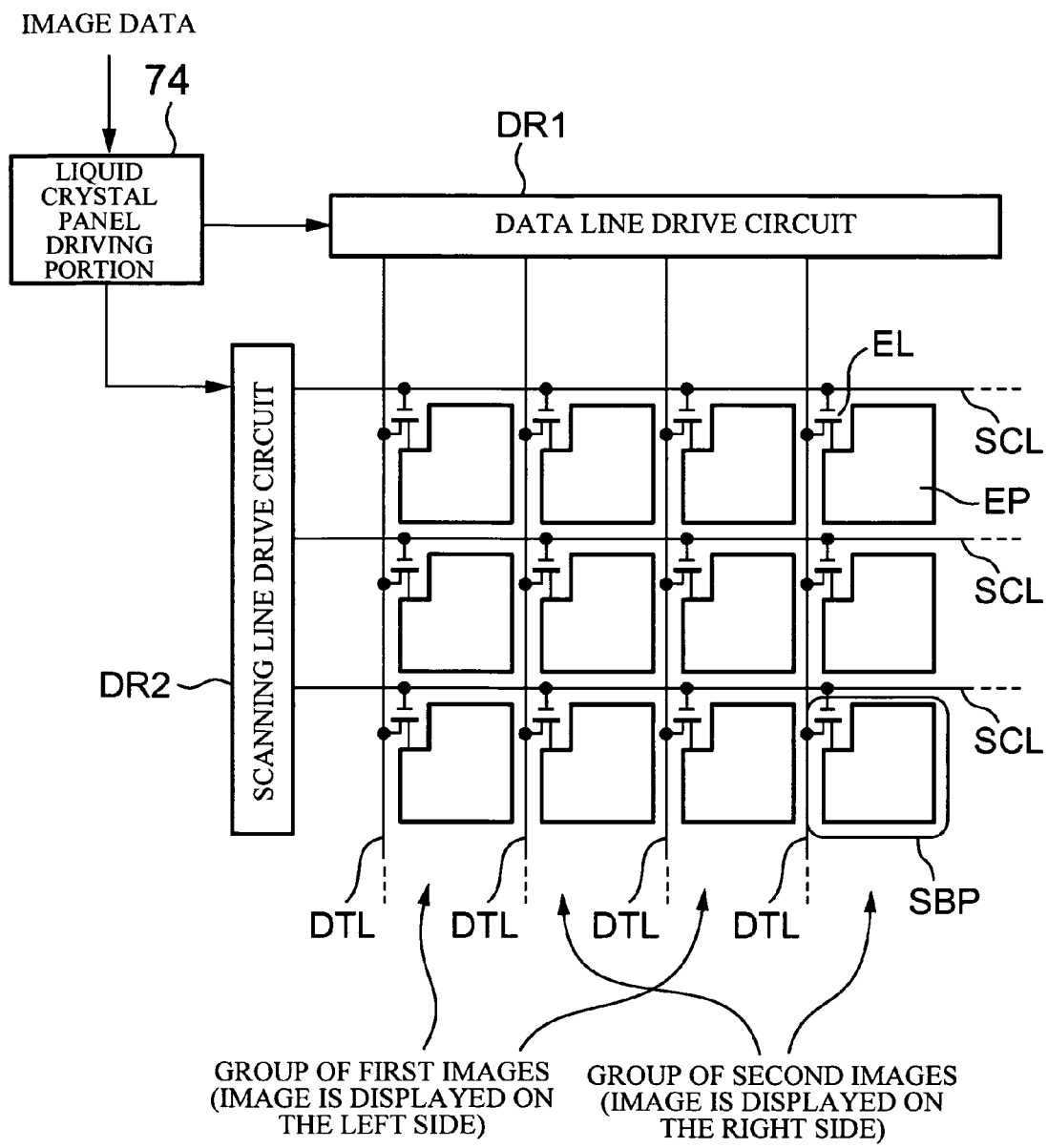
FIG. 9 is a circuit diagram of a TFT substrate in accordance with the first embodiment of the present invention.

FIG. 3 through FIG. 9 illustrate specific configurations of the display apparatus in accordance with the first embodiment of the present invention. FIG. 3 is a functional block diagram of the display apparatus. FIG. 4 is a functional block diagram showing a configuration of the controller. FIG. 5 is a functional block diagram of first and second image quality adjusting circuits. FIG. 6 is a functional block diagram of an image outputting portion. FIG. 7 is a view illustrating a cross-sectional configuration and effects of a liquid crystal panel. FIG. 8 is a front view of the liquid crystal panel. FIG. 9 is a circuit diagram of a TFT substrate.

Referring now to FIG. 3, the display apparatus includes the display 100, a controller 20, a distribution circuit 30, a first image quality adjusting circuit 50A, a second image quality adjusting circuit 50B, an image outputting portion 70, and the like. The display controller 10 includes the controller 20, the distribution circuit 30, the first image quality adjusting circuit 50A, the second image quality adjusting circuit 50B, the image outputting portion 70, and the like.

Referring now to FIG. 4, the controller 20 includes a processor (CPU) 21, an interface 22, a ROM 23, a RAM 24, and the like. The controller 20 controls the display apparatus according to a program stored in the ROM 23 in a comprehensive manner. Also, the controller 20 controls a visible range of the first image IM1 and a visible range of the second image IM2, which are separated from each other by superimposing the first image IM1 and the second image IM2 to be displayed on the display 100, by adjusting the image quality of at least one of the first image IM1 and the second image IM2 to have a given range.

The controller 20 is connected to a camera 310, a compact disc/mini disc (CD/MD) reproducing portion 320, a radio receiver 330, a TV receiver 340, a digital versatile disc (DVD) reproducing portion 350, a hard disc (HD) reproducing portion 360, a navigation portion 370, and the like, so as to send and receive data and control the afore-described components, which are mounted on a vehicle and respectively serve as supply sources supplying images and sounds, as illustrated in FIG. 3. The camera 310 captures images of surroundings and the like of the vehicle. The CD/MD reproducing portion 320 reproduces music or images. The radio receiver 330 receives radio waves via an antenna. The TV receiver 340 receives TV waves via an antenna through a selector 341. The DVD reproducing portion 350 reproduces music information and images. The HD reproducing portion 360 reproduces images and music information stored in a hard disc. The navigation portion 370 outputs a map or route guide image on the basis of road information received by a VICS information receiver 371 and geographic information received by a GPS information receiver 372.

Additionally, the controller 20 is also connected to an external memory 140, the operating portion 150, a remote control send and receive portion 170, a brightness detecting sensor 190, a passenger detecting sensor 200, and the like, and enables various controls on the basis of various kinds of data obtained from the aforementioned components. The external memory 140 stores various kinds of data. The operating portion 150 is provided for operating the display apparatus. The remote control send and receive portion 170 sends and receives infrared signals or wireless signals between a remote controller 171 provided for controlling the display apparatus remotely. The brightness detecting sensor 190 is composed of a light switch or a light sensor to detect the brightness inside the vehicle. The passenger detecting sensor 200 is composed of a pressure-sensitive sensor or the like on the driver's seat or the front passenger's seat to detect a passenger in the vehicle.

The distribution circuit 30, as illustrated in FIG. 3, distributes sound data and image data supplied from the above-described camera 310, the CD/MD reproducing portion 320, the radio receiver 330, the TV receiver 340, the DVD reproducing portion 350, the HD reproducing portion 360, the navigation portion 370, and the like, to the first image quality adjusting circuit 50A or the second image quality adjusting circuit 50B, according to a control instruction issued by the controller 20.

A sound adjusting circuit 60 adjusts the sound data supplied from the distribution circuit 30 to output to a speaker 61, as illustrated in FIG. 3.

Each of the first image quality adjusting circuit 50A and the second image quality adjusting circuit 50B, by reference to FIG. 5, includes a contrast adjusting portion 51, a brightness adjusting portion 52, a color tone adjusting portion 53, a gamma value adjusting portion 54, and the like, and adjusts the image qualities (contrast, brightness, color tone, and gamma value) of the image qualities of the first image data and the second image data, in response to the control instruction issued by the controller 20.

Referring now to FIG. 6, the image outputting portion 70 includes a first write circuit 71, a second write circuit 72, a video RAM (VRAM) 73, a liquid crystal panel driving portion 74, and the like. The first image data and the second image data, image qualities of which have respectively been adjusted by the first image quality adjusting circuit 50A and the second image quality adjusting circuit 50B, are respectively written into the first write circuit 71 and the second write circuit 72. The first write circuit 71 and the second write circuit 72 respectively write the first image data and the second image data into given addresses of the VRAM 73, in order to superimpose such adjusted first image data and such adjusted second image data.

The VRAM 73 retains the image data on which the first image data and the second image data are combined. Such combined image data corresponds to respective pixels of the display 100. The liquid crystal panel driving portion 74 is a circuit that drives a liquid crystal panel 110, and also drives the corresponding pixels of the liquid crystal panel 110, on the basis of the combined image data retained in the VRAM 73. The liquid crystal panel 110 will be described later in detail.

The display 100 includes the liquid crystal panel 110, a backlight 120, a touch panel 130, and the like, as illustrated in FIG. 3. The backlight 120 sheds illuminated lights from the backside of the liquid crystal panel 110. The touch panel 130 is provided for inputting a signal to operate the display apparatus. Here, the touch panel 130 is not shown, yet is formed in a shape of transparent sheet and adhered to the front surface of the liquid crystal panel 110.

Referring now to FIG. 7, the liquid crystal panel 110 has a known structure. Sequentially from the backlight 120, there are provided a deflecting plate 111, a thin film transistor (TFT) substrate 112, a liquid crystal layer 113, a color filter substrate 114 having pixels for three primary colors of RGB, a parallax barrier 115, a glass plate 116, a deflecting plate 117, and the like.

The above-described liquid crystal panel 110 has a display screen in which, for example, 800 pixels are arranged in a horizontal direction and 480 pixels in a vertical direction, as illustrated in FIG. 7 and FIG. 8. Also, left-hand side display pixels 118 (hereinafter, also referred to as front passenger's display pixel 118) and right-hand side display pixels 119 (hereinafter, also referred to as driver's display pixel 119) are alternately arranged in a horizontal direction of the display screen.

The parallax barrier 115 is formed in a stripe-shaped manner, and includes shielding portions and transmitting portions, as illustrated in FIG. 7 and FIG. 8. The shielding portions are located to correspond to portions arranged between the left-hand side display pixels 118 and the right-hand side display pixels 119. By providing the parallax barrier 115 on the front surface of the color filter substrate 114, among the illuminated lights that have passed through the left-hand side display pixels 118, only the lights going towards the left side selectively pass through the transmitting portions of the parallax barrier 115. Among the illuminated lights that have passed through the right-hand side display pixels 119, only the lights going towards the right side selectively pass through the transmitting portions of the parallax barrier 115. This enables the first image IM1 to be visible from the right side (the driver's seat) of the liquid crystal panel 110, and also enables the second image IM2 to be visible from the left side (the front passenger's side). Here, a similar parallax barrier as disclosed in Japanese Patent Application Publication No. 10-123461 or Japanese Patent Application Publication No. 11-84131 may be employed for the parallax barrier 115.

The TFT substrate 112, by reference to FIG. 9, includes a data line drive circuit DR1, a scanning line drive circuit DR2, vertically arranged scanning lines SCL, horizontally arranged data lines DTL, TFT elements EL, pixel electrodes EP corresponding to the TFT elements EL, and the like, whereas each of the TFT elements EL is formed in each region where each of the scanning lines SCL and each of the data lines DTL are crossed. Sub pixels SBP are formed by regions surrounded by the scanning lines SCL and the data lines DTL, and the sub pixels SBP arranged along each of the data lines DTL are alternately assigned to the left-hand side display pixels 118 and the right-hand side display pixels 119. A drive timing of the data line drive circuit DR1 is controlled by the liquid crystal panel driving portion 74 to control a voltage applied to the pixel electrode EP. A Drive timing of the scanning line drive circuit DR2 is controlled by the liquid crystal panel driving portion 74 to selectively scan the TFT element EL.

Figure 10:
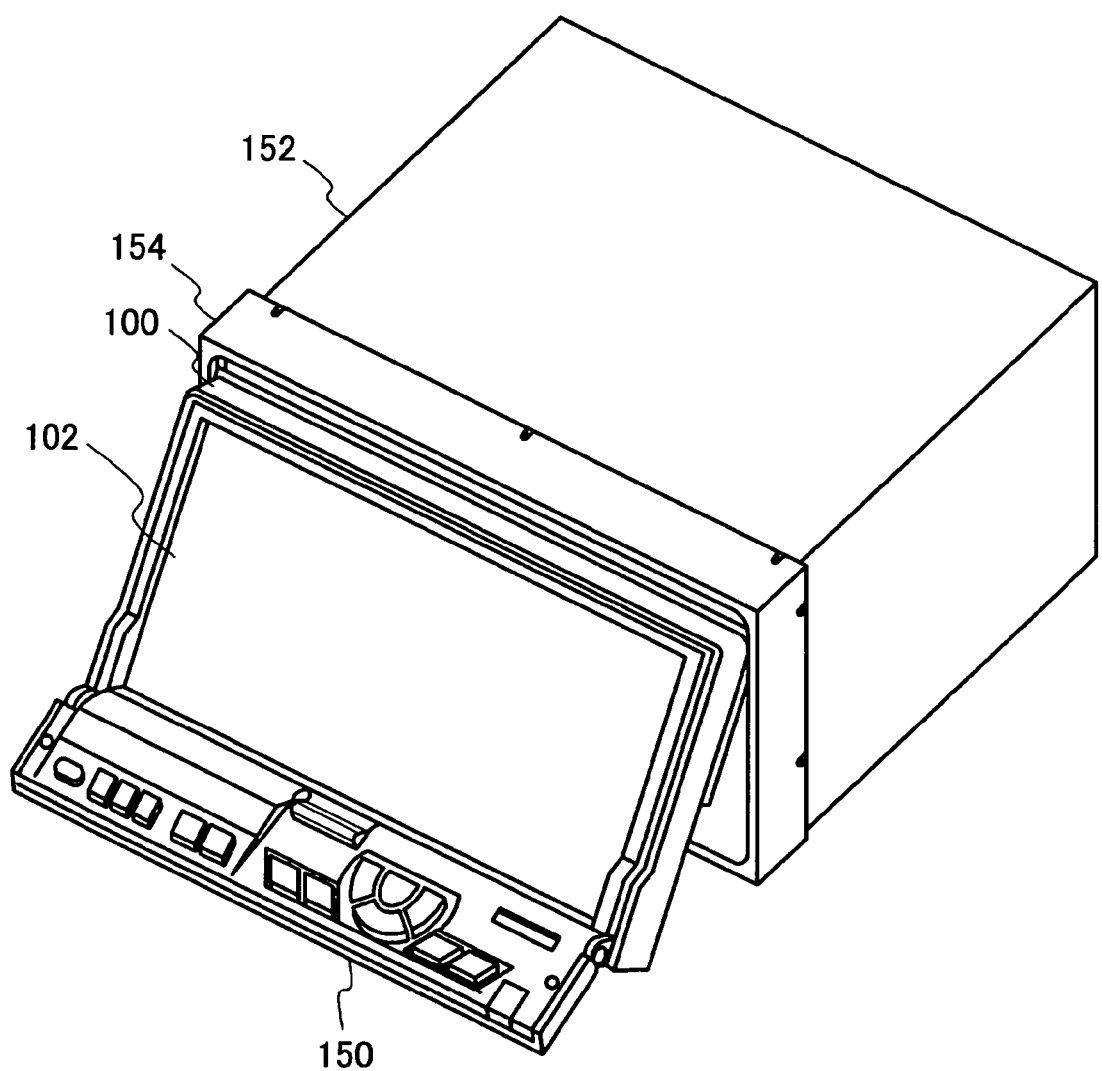
FIG. 10 is an external view of the display apparatus in accordance with the first embodiment of the present invention.

FIG. 10 is an external view of the display apparatus in accordance with the first embodiment of the present invention. The display apparatus is composed of the display 100 and a main body 152. The display 100 has a display screen 102 and the operating portion 150. The display 100 is used in such a manner that the display 100 is accommodated in a frame 154 provided in the perimeter of the front surface of the main body 152. The display 100 can be opened by moving the display 100 on a slant, as illustrated in FIG. 10, and the storage medium such as a DVD or the like can be operated from the front side of the main body 152.

Figure 11A:
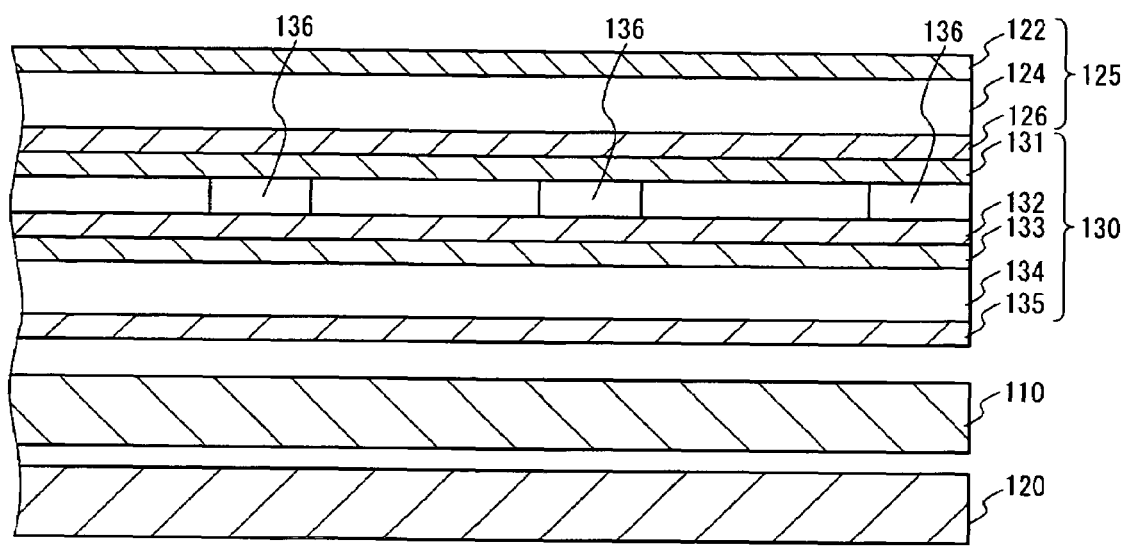
FIG. 11A is a cross-sectional view showing a display in accordance with the first embodiment of the present invention.

FIG. 11A is a cross-sectional view showing the display 100 in accordance with the first embodiment of the present invention. The liquid crystal panel 110 is provided at the surface side (the side to which lights are emitted from the display screen 102) of the backlight 120. The touch panel 130 is provided at the surface side of the liquid crystal panel 110. A surface cover layer 125 is provided on the surface side of the touch panel 130. That is to say, the touch panel 130 is provided between the liquid crystal panel 110 and the surface cover layer 125. In other words, the touch panel 130 is provided between the liquid crystal panel 110 and an antiglare layer 122, which will be described in detail later. The touch panel 130 includes a glass plate 134 having antireflection layers 133 and 135 provided on both sides thereof, and transparent electrodes 131 and 132 provided at the front surface side thereof. The transparent electrodes 131 and 132, each of which is made of an indium tin oxide (ITO) film, are sealed together with a two-sided tape spacer 136. The spacers 136 and the transparent electrodes 131 form a touch operating portion. The surface cover layer 125 includes a transparent surface sheet 124 made of polyethylene terephthalate (PET) or the like, the antiglare layer 122 provided on the surface side thereof, and an antireflection layer 126 on the backside thereof.

With the configuration described heretofore, the operator touches the surface of the touch panel 130, while watching the image being displayed on the liquid crystal panel 110, thereby bringing the transparent electrodes 131 and 132 into contact with each other to function as a touch panel switch.

Figure 11B:
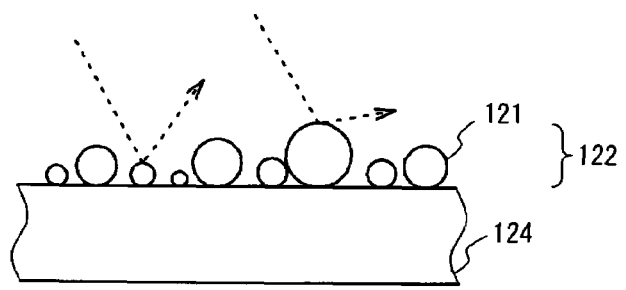
FIG. 11B is a view illustrating the configuration and function of an antiglare layer in accordance with the first embodiment of the present invention.

Next, a description is given of the function of the surface cover layer 125. Referring to FIG. 11B, the antiglare layer 122 is provided on the transparent surface sheet 124 made of PET having a film thickness of 120 micrometers, and includes transparent spherical particles 121 arranged thereon, each of which has a diameter of several micrometers to 10 micrometers. Accordingly, as illustrated in FIG. 11B, the lights entered from the surface are reflected scattering in various directions by the transparent spherical particles 121. This makes it possible to prevent a real-world scene in front of the display screen from being superimposed over the screen. This is the reason, for example, an antiglare layer 122a is provided on the surface side of a transparent surface sheet 124a as a surface cover layer 125a shown in FIG. 12A. That is to say, it is possible to prevent real-world scene in front of the display screen from being superimposed over the screen by providing the antiglare layer 122a on the surface side of the liquid crystal panel 110.

Figure 12A:
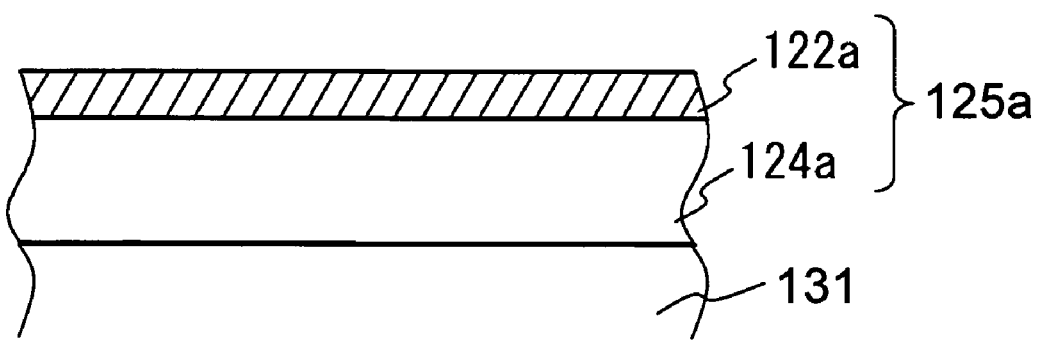
FIG. 12A and FIG. 12B are modifications of a surface cover layer in accordance with the first embodiment of the present invention.

However, according to experiments of the inventors, the periodically caused glare of a difference in brightness occurs on the screen, when the configuration shown in FIG. 12a is employed for the multi-view display apparatus having the parallax barrier 115 configured such that different images are visible from different angles. The cause is not apparent, yet it is considered that there is interference between, for example, the antiglare layer 122 and the parallax barrier 115, or the interference among the antiglare layer 122, the parallax barrier 115, and the touch panel 130. In either case, the glare is caused in association with the antiglare layer 122 and the parallax barrier 115.

Figure 12B:
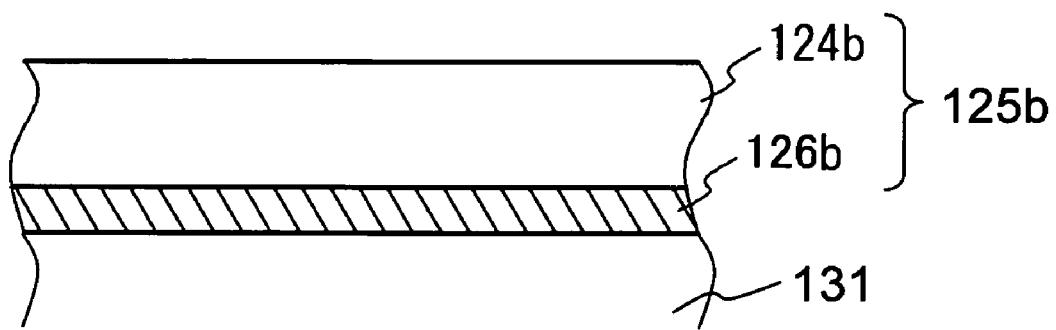

Hence, as a surface cover layer 125b shown in FIG. 12B, an antireflection layer 126b is provided on the backside of a surface sheet 124b. In other words, the antireflection layer 126b is provided between the liquid crystal panel 110 and the antiglare layer 122. The antireflection layer 126b has a configuration in which multiple transparent sheets are laminated, and has a function of preventing the reflection of the light having a specific wavelength. As an example, the antireflection layer 126b prevents the reflection of the lights in a visible light range. In this manner, the elimination of the antiglare layer 122 makes it possible to suppress the periodically occurring glare of a difference in brightness caused by the antiglare layer 122. Also, the antireflection layer 126b makes it possible to suppress the real-world scene in front of the display screen from being superimposed over the screen.

It is to be noted that it is insufficient to prevent the real-world scene in front of the display screen from being superimposed over the screen, when the configuration shown in FIG. 12B is employed. In addition, once the surface cover layer 125 is touched by a finger, a fingerprint left on the surface cover layer 125 causes the glare on the screen. This is the reason the antiglare layer 122 is provided on the surface of the surface sheet 124, as described in the first embodiment and illustrated in FIG. 11A. Here, if the antiglare layer 122 is configured to have the spherical particles 121 having smaller diameters and less density on the surface sheet 124 than those of the antiglare layer 122a solely provided as illustrated in FIG. 12A, the scattering effect as illustrated in FIG. 11B is reduced in the reflected lights. It is insufficient to prevent the real-world scene in front of the display screen from being superimposed over the screen, when the antiglare layer 122 is solely used.

The antiglare layer 122 is employed together with the antireflection layer 126, enabling the effect of preventing the real-world scene in front of the display screen from being superimposed over the screen. In addition, the scattering effect of the antiglare layer 122 is reduced, enabling to suppress the periodically caused glare of a difference in brightness on the screen. Furthermore, even when the surface cover layer 125 is touched by a finger, it is possible to prevent the glare on the screen caused by the fingerprint adhered to the surface cover layer 125.

In the first embodiment, the multi-view display apparatus having the parallax barrier 115 has been described as an exemplary embodiment of the present invention. However, the present invention is not limited to the above-described embodiment. Also, the configurations of the antiglare layer 122 and the antireflection layer 126 are not limited to the above-described ones, if alternative components have similar functions.

Finally, various aspects of the present invention are summarized in the following.

According to an aspect of the present invention, there is provided a display apparatus including: a liquid crystal display having a parallax barrier so that a first image and a second image are respectively visible from different angles on a commonly provided display screen; a backlight that sheds lights from a backside of a liquid crystal panel included in the liquid crystal display; a touch operating portion provided at a surface side of the liquid crystal display; and an antiglare layer provided at a surface side of the touch operating portion.

The display apparatus may further include a first antireflection layer provided between the parallax barrier and the touch operating portion.

The display apparatus may further includes a second antireflection layer provided between the antiglare layer and the touch operating portion. The second antireflection layer suppresses interference between the antiglare layer and the parallax barrier.

The display apparatus may have both the first and second antireflection layers.

The present invention can be summarized as follows. According to another aspect of the present invention, there is provided a display apparatus including: a display controller that outputs to a commonly provided display, output image data that includes at least one of first image data and second image data, the first image data being supplied from a first image source, the second image data being supplied from a second image source; a liquid crystal display having a parallax barrier so that a first image and a second image are respectively visible from different angles on a commonly provided display screen; a touch operating portion provided at a surface side of the liquid crystal display; an antiglare layer provided at a surface side of the touch operating portion; a first antireflection layer provided between the parallax barrier and the touch operating portion; and a second antireflection layer provided between the antiglare layer and the touch operating portion.

According to yet another aspect of the present invention, there is provided a display apparatus including: a display controller that outputs to a commonly provided display, output image data that includes at least one of navigation image data and TV program image data, the navigation image data being supplied from a navigation portion, the TV program image data being supplied from a TV program portion; a liquid crystal display having a parallax barrier so that a navigation image and a TV program image are respectively visible from a driver's seat and from a front passenger's seat on a commonly provided display screen; a touch operating portion provided at a surface side of the liquid crystal display; an antiglare layer provided at a surface side of the touch operating portion; a first antireflection layer provided between the parallax barrier and the touch operating portion; and a second antireflection layer provided between the antiglare layer and the touch operating portion.

According to a further aspect of the present invention, there is provided a display apparatus including: a display controller that outputs to a commonly provided display, output image data that includes at least one of navigation image data and TV program image data, the navigation image data being supplied from a navigation portion, the TV program image data being supplied from a TV program portion; a backlight; a liquid crystal display provided at a front side of the backlight and having a parallax barrier so that a navigation image and a TV program image are respectively visible from a driver's seat and from a front passenger's seat on a commonly provided display screen; a touch panel having, sequentially from the liquid crystal display to a surface of the display apparatus, a first antireflection layer, a glass plate, a second antireflection layer, and an electrode; and a surface cover layer having, sequentially from the touch operating portion to the surface of the display apparatus, a third reflection layer, a transparent sheet, and an antiglare layer.

The present invention is not limited to the above-mentioned embodiment, and other embodiments, variations and modifications may be made without departing from the scope of the present invention.

The present invention is based on Japanese Patent Application No. 2005-274792 filed on Sep. 21, 2005, the entire disclosure of which is hereby incorporated by reference.

What is claimed is:

1. A display apparatus comprising:

a liquid crystal display having a parallax barrier so that a first image and a second image are respectively visible from different angles on a commonly provided display screen;

a backlight that sheds lights from a backside of a liquid crystal panel included in the liquid crystal display;

a touch operating portion provided at a surface side of the liquid crystal display;

an antiglare layer provided at a surface side of the touch operating portion;

a first antireflection layer provided between the parallax barrier and the touch operating portion; and a second antireflection layer provided between the antiglare layer and the touch operating portion.

2. The display apparatus as claimed in claim 1, wherein the second antireflection layer prevents reflection of a light having a specific wavelength.

3. A display apparatus comprising:
a display controller that outputs to a commonly provided display, output image data that includes at least one of first image data and second image data, the first image data being supplied from a first image source, the second image data being supplied from a second image source;
a liquid crystal display having a parallax barrier so that a first image and a second image are respectively visible from different angles on a commonly provided display screen;
a touch operating portion provided at a surface side of the liquid crystal display;
an antiglare layer provided at a surface side of the touch operating portion;
a first antireflection layer provided between the parallax barrier and the touch operating portion; and
a second antireflection layer provided between the antiglare layer and the touch operating portion.

4. A display apparatus comprising:
a display controller that outputs to a commonly provided display, output image data that includes at least one of navigation image data and TV program image data, the navigation image data being supplied from a navigation portion, the TV program image data being supplied from a TV program portion;
a liquid crystal display having a parallax barrier so that a navigation image and a TV program image are respectively visible from a driver's seat and from a front passenger's seat on a commonly provided display screen;
a touch operating portion provided at a surface side of the liquid crystal display;
an antiglare layer provided at a surface side of the touch operating portion;
a first antireflection layer provided between the parallax barrier and the touch operating portion; and
a second antireflection layer provided between the antiglare layer and the touch operating portion.

* * * * *